(12) United States Patent
Nordbruch et al.

(10) Patent No.: US 11,594,132 B2
(45) Date of Patent: Feb. 28, 2023

(54) PARKING FACILITY MANAGEMENT SERVER FOR A PARKING FACILITY

(71) Applicant: Robert Bosch GmbH, Stuttgart (DE)

(72) Inventors: Stefan Nordbruch, Kornwestheim (DE); Albrecht Irion, Stuttgart (DE); Hans-Joerg Mathony, Tamm-Hohenstange (DE); Holger Mielenz, Ostfildern (DE); Rolf Nicodemus, Bietigheim-Bissingen (DE); Stefan Hoffmann, Bietigheim (DE)

(73) Assignee: Robrt Bosch GmbH, Stuttgart (DE)

( * ) Notice: Subject to any disclaimer, the term of this patent is extended or adjusted under 35 U.S.C. 154(b) by 168 days.

(21) Appl. No.: 15/523,877

(22) PCT Filed: Sep. 29, 2015

(86) PCT No.: PCT/EP2015/072433
§ 371 (c)(1),
(2) Date: May 2, 2017

(87) PCT Pub. No.: WO2016/082995
PCT Pub. Date: Jun. 2, 2016

(65) Prior Publication Data
US 2017/0323565 A1 Nov. 9, 2017

(30) Foreign Application Priority Data
Nov. 26, 2014 (DE) .......................... 102014224113.8

(51) Int. Cl.
*G08G 1/09* (2006.01)
*G05D 1/02* (2020.01)
(Continued)

(52) U.S. Cl.
CPC ....... *G08G 1/096725* (2013.01); *B60W 30/06* (2013.01); *G01C 21/3407* (2013.01);
(Continued)

(58) Field of Classification Search
CPC .............. B60W 30/06; G01C 21/3407; G01C 21/3685; G05D 1/0225; G06Q 10/04;
(Continued)

(56) References Cited

U.S. PATENT DOCUMENTS

2003/0105566 A1* 6/2003 Miller ................. B60R 16/0232
701/34.3
2004/0143490 A1* 7/2004 Kelly ..................... G06Q 10/06
705/13

(Continued)

FOREIGN PATENT DOCUMENTS

CN 201794344 U 4/2011
DE 102010021585 A1 1/2011
(Continued)

OTHER PUBLICATIONS

International Search Report dated Jan. 4, 2016, of the corresponding International Application PCT/EP2015/072433 filed Sep. 29, 2015.

*Primary Examiner* — Kira Nguyen
(74) *Attorney, Agent, or Firm* — Norton Rose Fulbright US LLP; Gerard Messina

(57) ABSTRACT

A parking facility management server for a parking facility, including a communication interface, which is designed to receive a request via a communication network from a user of the communication network to carry out at least one vehicle-specific service for a vehicle in the parking facility, and a processor, which is designed to process the request, in order to check whether or not the at least one service may be carried out in the parking facility for the vehicle in accordance with the request, the processor being further designed to ascertain a response as a function of the check. The communication interface further being designed to transmit the response via the communication network back to the user, the processor further being designed to plan and to (Continued)

coordinate the carrying out of the service in the event of a positive response that at least one service may be carried out.

11 Claims, 2 Drawing Sheets

(51) Int. Cl.
| | |
|---|---|
| *G08G 1/0967* | (2006.01) |
| *G08G 1/14* | (2006.01) |
| *B60W 30/06* | (2006.01) |
| *G01C 21/34* | (2006.01) |
| *G06Q 10/20* | (2023.01) |
| *G01C 21/36* | (2006.01) |
| *H04L 67/12* | (2022.01) |

(52) U.S. Cl.
CPC ......... *G01C 21/3685* (2013.01); *G06Q 10/20* (2013.01); *G08G 1/096741* (2013.01); *G08G 1/096775* (2013.01); *G08G 1/148* (2013.01); *G05D 1/0225* (2013.01); *H04L 67/12* (2013.01)

(58) Field of Classification Search
CPC ........ G06Q 10/06; G06Q 50/28; G06Q 50/30; G08G 1/096725; G08G 1/096741; G08G 1/096775; G08G 1/148; H04L 67/12
See application file for complete search history.

(56) References Cited

U.S. PATENT DOCUMENTS

| | | | | |
|---|---|---|---|---|
| 2009/0150306 | A1* | 6/2009 | Campbell | B60R 25/00 705/500 |
| 2009/0327011 | A1 | 12/2009 | Petroff | |
| 2010/0156672 | A1 | 6/2010 | Yoo et al. | |
| 2012/0188100 | A1* | 7/2012 | Min | G08G 1/143 340/932.2 |
| 2013/0226627 | A1* | 8/2013 | Kubovcik | G06Q 10/02 705/5 |
| 2013/0231824 | A1* | 9/2013 | Wilson | G05D 1/0246 701/26 |
| 2013/0285855 | A1* | 10/2013 | Dupray | G01S 19/48 342/451 |
| 2014/0074404 | A1 | 3/2014 | Hassan | |
| 2014/0379530 | A1* | 12/2014 | Kim | G07F 17/20 705/26.81 |
| 2015/0081161 | A1* | 3/2015 | Chapman | G07C 5/008 701/31.5 |
| 2015/0199685 | A1* | 7/2015 | Betancourt | G06Q 20/40 705/44 |
| 2015/0345965 | A1* | 12/2015 | Semsey | G07B 15/02 701/537 |
| 2017/0124534 | A1* | 5/2017 | Savolainen | G09C 1/00 |

FOREIGN PATENT DOCUMENTS

| | | |
|---|---|---|
| DE | 102011084124 A1 | 4/2013 |
| DE | 102011088809 A1 | 6/2013 |
| DE | 102012010042 A1 | 11/2013 |
| DE | 102012222562 A1 | 6/2014 |
| DE | 102012224149 A1 | 6/2014 |
| DE | 102013222071 A1 | 4/2015 |
| DE | 102014116549 A1 | 5/2015 |
| JP | 2002024367 A | 1/2002 |

* cited by examiner

PARKING FACILITY MANAGEMENT SERVER FOR A PARKING FACILITY

FIELD

The present invention relates to a parking facility management server for a parking facility. The present invention also relates to a method for operating a parking facility management server for a parking facility. The present invention further relates to a parking system for vehicles and to a computer program.

BACKGROUND INFORMATION

German Patent Application No. DE 10 2012 222 562 A1 describes a system for managed parking areas for transferring a vehicle from a start position to a target position.

SUMMARY

An object of the present invention is to provide a parking facility management server for a parking facility.

An object of the present invention may also be to provide a method for operating a parking facility management server for a parking facility.

An object of the present invention may also be to provide a parking system for vehicles.

An object of the present invention may further be to provide a computer program.

These objects may be achieved with the aid of the respective subject matter of the present invention. Advantageous embodiments of the present invention are described herein.

According to one aspect, a parking facility management server for a parking facility is provided, including:
- a communication interface, which is designed to receive a request via a communication network from a user of the communication network to carry out at least one vehicle-specific service for a vehicle in the parking facility, and
- a processor, which is designed to process the request, in order to check whether or not the at least one service may be carried out in the parking facility for the vehicle in accordance with the request,
- the processor being further designed to ascertain a response as a function of the check,
- the communication interface further being designed to transmit the response back to the user via the communication network,
- the processor further being designed to plan and to coordinate the carrying out of the service in the event of a positive response that at least one service may be carried out.

According to yet another aspect, a method for operating a parking facility management server for a parking facility is provided,
- the parking facility management server receiving a request via a communication network from a user of the communication network to carry out at least one vehicle-specific service for a vehicle in the parking facility,
- processing the request, in order to check whether or not the at least one service may be carried out in the parking facility for the vehicle in accordance with the request,
- ascertaining a response as a function of the check, and transmitting the response back to the user via the communication network,
- the parking facility management server planning and coordinating a carrying out of the service in the event of a positive response that at least one service may be carried out.

According to another aspect, a parking system for vehicles is provided, the parking system including a parking facility and the parking facility management server according to the present invention.

According to another aspect, a computer program is provided, which includes program codes for carrying out the method according to the present invention when the computer program is executed on a computer.

Thus, the present invention, in response to a request for carrying out a vehicle-specific service for a vehicle in a parking facility, includes, in particular, the concept of initially checking whether or not the requested or queried service may be carried out in accordance with the request. In the event of a positive response, i.e., if the service may be carried out, it is provided according to the present invention that this is automatically planned and coordinated. Since this is a service that is carried out in the parking facility, it may be advantageously effectuated that the service is also carried out automatically as part of an automatic parking operation of the vehicle. In general, a driver does not need his/her vehicle when the vehicle is parked. Thus, for a driver, the carrying out of the vehicle-specific service in the parking facility in this case means no unnecessary loss of time. Namely, as long as the driver of the vehicle does not need his/her vehicle, i.e., parks it in the parking facility, services or vehicle-specific services may be carried out without the driver having to be burdened by carrying them out.

The checking according to one specific embodiment includes a check whether or not the service may be carried out during the intended parking duration or parking time of the vehicle and/or in a remaining parking time of the vehicle.

A parking facility within the meaning of the present invention may also be referred to as a parking area and is used as a parking area for vehicles. Thus, the parking facility forms, in particular, a continuous area, which includes multiple parking spaces (in the case of a parking facility on private property) or parking zones (in the case of a parking facility on public property). The parking facility according to one specific embodiment may include a parking deck. The parking facility includes, in particular, a parking garage.

During fully-automated or fully automatic (autonomous) valet parking, a vehicle is parked by its driver at a drop-off location or drop-off position, for example, in front of a parking facility and from that point, the vehicle drives itself, i.e., autonomously or remotely-controlled, into a parking position or into a parking spot and from there back again to the drop-off location. During this operation, the driver may, but is not required to, remain in the vehicle.

Autonomous within the meaning of the present invention means, in particular, that the vehicle navigates itself, i.e., with no driver intervention. Thus, the vehicle drives by itself or autonomously into the parking facility, without a driver having to steer the vehicle for such purpose. The driver him/herself is no longer required to remain in the vehicle. Thus, this means, in particular, that the vehicle includes a guidance device for the navigation of the vehicle, which is configured to autonomously guide or steer the vehicle into the parking facility. A guidance or a steering includes, in particular, a lateral guidance and/or a longitudinal guidance or steering of the vehicle. Such an autonomously driving vehicle, which is able to park and unpark automatically, is referred to as an AVP vehicle, for example. AVP stands for "automatic valet parking" and may be translated as "automatic parking operation".

According to one specific embodiment, the vehicle is an AVP vehicle.

According to another specific embodiment, the communication network includes a WLAN network and/or mobile communication network.

A drop-off position or a drop-off location within the meaning of the present invention is a position, at which a driver of the vehicle may park his/her vehicle for an autonomous or remotely-controlled parking operation and from which he/she may pick up his/her vehicle again at a later point in time.

A parking position within the meaning of the present invention is a position, at which the vehicle is intended to autonomously park. A parking position includes a parking spot, for example.

In one specific embodiment, it is provided that the vehicle navigates autonomously or remotely-controlled from the drop-off position to the parking position.

In another specific embodiment, it is provided that the vehicle autonomously parks in the parking position or is parked remotely-controlled in the parking position.

According to another specific embodiment, it is provided that the vehicle unparks autonomously or remotely controlled from the parking position.

In another specific embodiment, it is provided that the vehicle navigates, drives or drives remotely-controlled autonomously or remotely-controlled from the parking position to the drop-off position.

According to one specific embodiment, the communication via the communication network is encrypted.

In another specific embodiment, it is provided that the vehicle drives autonomously from a position outside the parking facility to the drop-off position. The position outside the parking facility is an instantaneous position of the vehicle, for example.

According to one specific embodiment, it is provided that in the event of a negative response, that at least one service cannot be carried out, this response is also transmitted to the user via the communication network.

According to one specific embodiment, multiple vehicle-specific services are provided, which are identically or preferably variously designed, for example. This means, therefore, that the request includes multiple vehicle-specific services, which are intended to be carried out in the parking facility. Specific embodiments in conjunction with one vehicle-specific service apply analogously to multiple vehicle-specific services and vice versa.

According to one specific embodiment, the one or the multiple vehicle-specific services are selected from the following group of vehicle-specific services: vehicle cleaning, in particular, vehicle interior cleaning and/or vehicle exterior cleaning (a cleaning includes, in particular, a wash), filling a fuel tank of the vehicle, charging an electrical energy store, for example, a battery or an accumulator of an electric vehicle, carrying out an inspection, carrying out repairs, carrying out a tire change, carrying out a TUV check and/or HU check (TUV stands for Technical Inspection Association and HU stands for general inspection), carrying out an exhaust emission test.

According to one specific embodiment, it is provided that the planning and coordinating include an ascertainment of a setpoint trajectory in the parking facility to be followed by the vehicle as a function of the requested service. In this way, it is advantageously effectuated that the setpoint trajectory of the vehicle to be followed in the parking facility may be efficiently planned. Other setpoint trajectories, namely, are meaningful, depending on the kind and type or scope of the requested service.

According to one specific embodiment, a service installation is provided in the parking facility, which is designed to carry out a vehicle-specific service. The service installation may, for example, be a gas station or a repair shop, depending on the type of service. Multiple service installations are provided, for example, which are, in particular, identically or preferably variously designed. Embodiments in conjunction with one service installation apply analogously to multiple service installations and vice versa.

According to one specific embodiment, it is provided that the service installation is assigned a service position. This means, therefore, that the service position corresponds to the position or to the location in the parking facility at which the service installation in the parking facility is situated. The service position may be referred to, in particular, as a service position or as a service location or a service location.

According to one specific embodiment, it is provided that the planning and coordinating include a check whether or not a service installation is available to carry out the at least one service, the processor being designed to ascertain the setpoint trajectory as a function of the check whether or not the service installation is available.

This yields, in particular, the technical advantage that the setpoint trajectory also leads to the service installation only if the facility is available. This means, therefore, that the setpoint trajectory is planned in such a way that the vehicle, when following the setpoint trajectory, arrives at the service installation if it is available, i.e., is able to carry out the service.

The fact that the service installation is available means, in particular, that the service installation is able to carry out the service. The fact that the service installation is not available means, in particular, that the service installation is unable to carry out the service, for example, because it is occupied or is closed.

In another specific embodiment, it is provided that the setpoint trajectory includes a start position, a target position, a parking position located between the start position and the target position and a respective service position located between the start position and the target position, at which the at least one service is carried out, so that the vehicle is able to drive from the start position to the target position via the parking position and the service position when following the setpoint trajectory.

This means, therefore, that the vehicle drives from the start position to the target position, in between which the vehicle drives into the parking position and parks there and also unparks again to drive further. Before approaching the parking position or after leaving the parking position, it is provided according to other specific embodiments that the service position or the service positions is or are approached in order to allow the requested service to be carried out there in each case. It is provided, in particular, that the service position is located before the parking position relative to a driving direction of the route corresponding to the setpoint trajectory, which the vehicle is intended to drive. In particular, it is provided that the service position is located after the parking position relative to a driving direction of the setpoint trajectory.

In the case of multiple service positions, it is provided, in particular, that these service positions are located both before and after the parking position. Thus, at least some of the services, which were queried or requested, may be advantageously carried out at the respective service positions before the vehicle is parked in the parking facility, other services being carried out at the corresponding service positions after the parking. This means, therefore, in particular, that the vehicle according to one specific embodiment departs from the start position and drives further to some of the service positions for the purpose of carrying out the services. The vehicle then drives to the parking position and parks there. There, it may unpark again and drive to additional service positions for the purpose of carrying out additional services. Subsequently, the vehicle preferably drives back again to the parking position and from there again to service positions and/or to the target position.

This means, therefore, that various options are provided with respect to a sequence of service positions to be driven to. It is provided, in particular, that in the interim the vehicle heads for or approaches the parking position and parks there.

A start position is a drop-off position or a drop-off location, for example. A target position is a drop-off location or a drop-off position, for example. This means, therefore, that the start position and the target position are identical. This means, therefore, that the vehicle drives from the drop-off position via the parking position and the one or the multiple service positions back to the drop-off position.

According to one specific embodiment, it is provided that the setpoint trajectory leads multiple times between the parking position and the service position, so that when following the setpoint trajectory, the vehicle is able to drive multiple times between the parking position and the service position. In this case, therefore, the vehicle drives multiple times back and forth between the parking position and the service position. It is provided, in particular, that each time the vehicle parks at the parking position and unparks again for the purpose of driving to the service position.

If the vehicle is intended to drive from the parking position to a service position, it is then provided according to one specific embodiment that a start signal is transmitted to the vehicle via the communication network in order to activate a drive motor of the vehicle, so that the vehicle is then able to drive or drives autonomously or remotely-controlled to the service position.

According to one specific embodiment, it is provided that the request for carrying out at least one vehicle-specific service for a vehicle in the parking facility is received before an arrival of the vehicle at the parking facility, i.e., already in advance. Thus, in general, there remains sufficient time to check whether or not the service may be carried out.

According to one specific embodiment, it is provided that the request is received when the vehicle is located at the start position, in particular, at the drop-off position. This means, therefore, that the vehicle has already arrived at the parking facility and places a request to the parking facility management server via the communication network.

In another specific embodiment, it is provided that the request is received by the parking facility management server during a parking time or parking duration of the vehicle on a parking position. This means, therefore, that the vehicle is already parked when the request is placed.

The specific embodiments regarding a point in time of a receipt of the request cited above may be combined with one another. Thus, this means, in particular, that requests are received, i.e., are placed already in advance and/or at the drop-off location and/or during the parking time.

A user of the communication network is a terminal, for example, in particular, a mobile terminal, for example, a smartphone or a mobile telephone. A terminal is a computer having a network connection, for example. It is possible via such a user for a driver to place his/her request to the parking facility management server. The driver him/herself may also be referred to as a user of the communication network to the extent he/she is able to participate in a communication of the communication network with the aid of his/her terminal.

According to one specific embodiment, it is provided that the processor is designed to ascertain an instantaneous status of the carrying out of the service, the communication interface being designed to transmit the instantaneous status to the user via the communication network. This yields, in particular, the technical advantage that the user of the communication network, i.e., a driver of the vehicle, for example, obtains knowledge of how far the carrying out of the service has already progressed. In this way, he/she is able to estimate, for example, how much time he/she still has for other activities. Thus, he/she is able to advantageously plan his/her daily routine chronologically in a particularly efficient manner.

In another specific embodiment, it is provided that in the event of a problem discovered as the service is being carried out, the communication interface is designed to transmit a message via the communication network to the user that a problem was discovered as the service was being carried out. This yields, in particular, the technical advantage that the user obtains knowledge of the fact that a problem has occurred. He/she may therefore respond appropriately.

In another specific embodiment, it is provided that the message includes a request as to whether the problem is to be remedied. This yields, in particular, the technical advantage that the user may decide what is to happen next. The message includes, in particular, a request as to how the problem is to be remedied.

According to another specific embodiment, a monitoring system is provided for monitoring and/or for recording the carrying out of the service and/or a driving of the vehicle in the parking facility. The monitoring system is included, for example, in a parking facility management server. The monitoring system includes, for example, one or multiple video cameras and/or one or multiple radar sensors and/or one or multiple ultrasonic sensors and/or one or multiple LIDAR sensors and/or one or multiple photoelectric barriers.

The monitoring offers, in particular, the advantage that potential problems may be detected. The recording offers, in particular, the advantage that even at a later point in time, i.e., for example, at a point in time after the vehicle has already left the parking facility, it may still be reconstructed how the service was carried out or how the driving of the vehicle on the parking facility proceeded.

According to one specific embodiment, the parking facility management server is configured or designed to execute or carry out the method for operating a parking facility management server for a parking facility.

According to one specific embodiment, the parking facility includes the parking facility management server.

Functionalities of the method result analogously from functionalities of the parking facility management server and vice versa. This means that method features result analogously from device features and vice versa.

The present invention is explained in greater detail below with reference to preferred exemplary embodiments.

DETAILED DESCRIPTION OF EXAMPLE EMBODIMENTS

Figure 1:
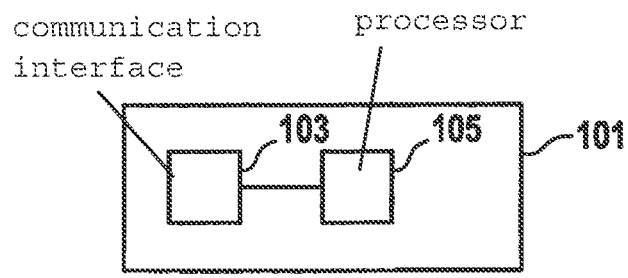
FIG. 1 shows a parking facility management server for a parking facility.

FIG. 1 shows a parking facility management server 101 for a parking facility.

Parking facility management server 101 includes a communication interface 103, which is designed to receive a request via a communication network from a user of the communication network for carrying out at least one vehicle-specific service for a vehicle in the parking facility.

Parking facility management server 101 includes a processor 105, which is designed to process the request, in order to check whether or not the at least one service may be carried out in the parking facility for the vehicle in accordance with the request. Processor 105 is also designed to ascertain a response as a function of the check. Communication interface 103 is designed to transmit the response back to the user via the communication network.

Processor 105 is also designed to plan and to coordinate the carrying out of the services in the event of a positive response that at least one service may be carried out.

Figure 2:
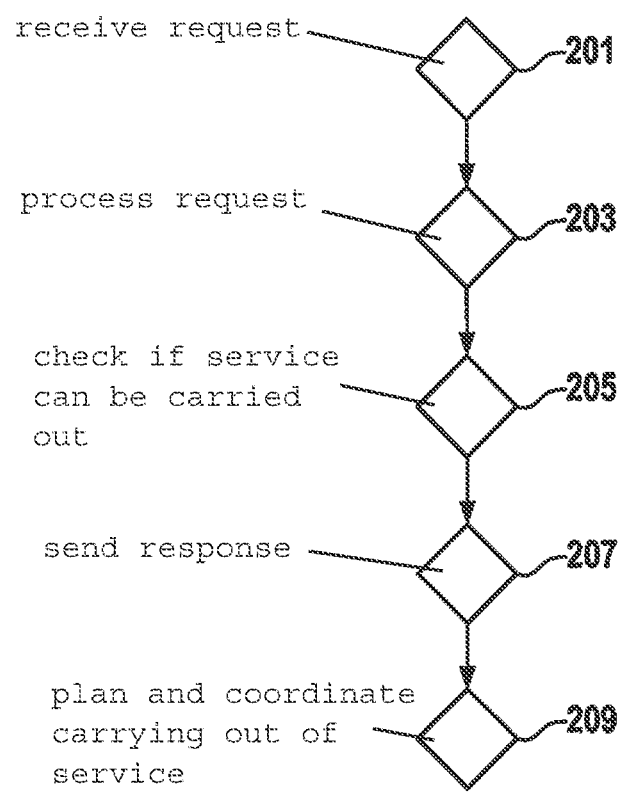
FIG. 2 shows a flow chart of a method for operating a parking facility management server for a parking facility.

FIG. 2 shows a flow chart for operating a parking facility management server for a parking facility. This may, for example, be parking facility management server 101 of FIG. 1.

In a step 201, the parking facility management server receives a request via a communication network from a user of the communication network for carrying out at least one vehicle-specific service for a vehicle in the parking facility. It processes this request according to a step 203 in order, according to a step 205, to check whether or not the at least one service may be carried out in the parking facility for the vehicle in accordance with the request. In a step 205, parking facility management server ascertains a response as a function of the check. It sends this response in a step 207 back to the user, this via the communication network. In a step 209, the parking facility management server plans and coordinates the carrying out of the service if it is a positive response, that at least one service may be carried out.

Figure 3:
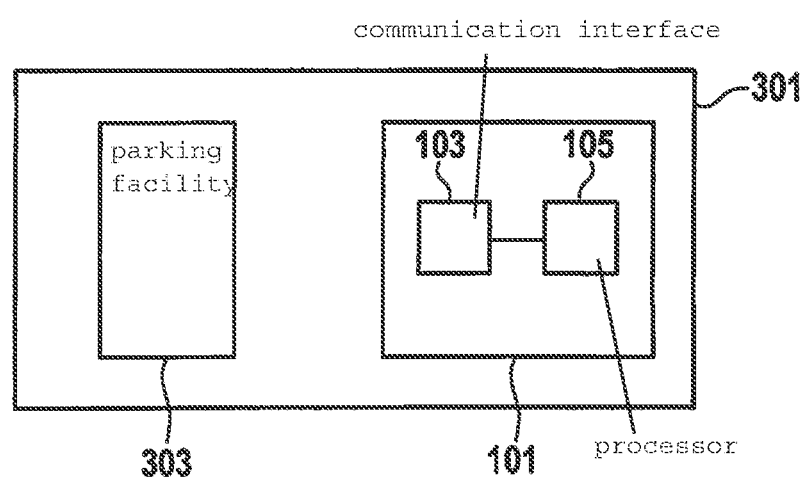
FIG. 3 shows a parking system for vehicles.

FIG. 3 shows a parking system 301 for vehicles.

Parking system 301 includes a parking facility 303 and parking facility management server 101 of FIG. 1.

Thus, the present invention includes, in particular, the notion of providing an efficient way, based on which additional convenience items with respect to a parking process in a parking facility may be automatically carried out. These additional convenience items are, in particular, the aforementioned services.

According to one specific embodiment, it is provided that the vehicle, in particular, the AVP vehicle, drives in a fully automated manner or autonomously to the service installations inside a parking garage, i.e., in general in a parking facility, or drives remotely-controlled to the service installations.

According to one specific embodiment, it is provided that a driver logs on to one or multiple services, which in general may also be referred to as additional services, in advance and/or at the drop-off location and/or during a parking time of the vehicle in a parking position. Thus, the log-on includes, in particular, the transmitting of a corresponding request for carrying out the service. Additional service involves services which are queried or requested in addition to the service regarding a parking in the parking facility.

According to one specific embodiment, it is provided that the parking facility management server, which in general may be included in a parking facility management system or in a parking garage management system, checks whether the additional service or the additional services may be offered during the intended parking duration or parking time. This is reported by the parking facility management server according to one specific embodiment back to the driver, generally to the user of the communication network. The reporting back includes, in particular, transmitting a corresponding response.

In the event of a positive feedback or positive response (i.e., in the event the order is accepted), the parking facility management server plans and coordinates the additional service or the additional services and preferably prepares the additional service; thus, it coordinates a preparation and a carrying out. A preparation and a coordination include, for example, carrying out an order for a spare part and/or carrying out a demand of an inspector, in particular, of a TUV inspector, in particular, of multiple inspectors, in particular, of multiple TUV inspectors.

According to one specific embodiment, it is provided that when coordinating or planning the additional services, a check is made as to how a timed coordination and a drive path, i.e., a setpoint trajectory, of the vehicle, in particular, of the AVP vehicle, is required for this purpose. There are the following possibilities for a setpoint trajectory, for example:

1. The vehicle drives directly from the drop-off location or drop-off position to a service position of the service installation and, if necessary, preferably from there to the next service installation or service installations and from there preferably again to a parking position, at which the vehicle parks. For a pickup of the vehicle, the vehicle drives from this parking position back to the drop-off location.
2. The vehicle drives to an intermediate parking position. This in the case if the service installation or the service installations are not yet available. If at least one or multiple of the service installations are available again, it then drives from the intermediate parking position further to the service installation or service installations, which have become available, and from there further to the next service installation and from there to the parking position. For a pickup, the vehicle then drives from the parking position to the drop-off location, i.e., similar to explanations provided above.
3. After the drop-off location, the vehicle drives initially to a parking position and parks there. From there, it drives to the service installations or to the service installation. This takes place before a pickup of the vehicle by a driver. From the service installations, it drives back to the drop-off location in order to be picked up by the driver.
4. The vehicle first drives from the drop-off location to the parking position. During a parking time or parking duration, it drives to the service installation or to the service installations and back to the parking position, this operation is also preferably carried out multiple times. From the parking position, it then drives back to the drop-off location as part of the pickup.
5. The vehicle first drives from the drop-off location to a service installation, from there further to the additional service installations or from there back to the drop-off location. This means that in this case no parking of the vehicle in a parking position is provided. The time during which the vehicle is located in the parking facility is thus advantageously utilized exclusively for carrying out the services, but not for parking. Thus, a parking position otherwise occupied by the vehicle or reserved for the vehicle is available for other vehicles.

According to one specific embodiment, it is provided that the services or actions, i.e., in particular, the additional services, are carried out after the drop-off location, i.e., after the vehicle has arrived at the parking facility, i.e., after it has been accepted by the parking facility management server or has been logged onto the parking facility management server.

According to one specific embodiment, it is provided that all actions are recorded for documentation, in particular, visually recorded.

According to one specific embodiment, the parking facility management server informs the driver of the vehicle about individual actions or about all actions, i.e., about the carrying out of the services.

In another specific embodiment, it is provided that the parking facility management server first informs the driver about individual actions or about all actions in response to an information request by the driver, i.e., about the carrying out and/or about the status of the carrying out of the services.

According to one specific embodiment, when problems are discovered, a driver is queried regarding a remedy. A problem is, for example, a defect, a flat tire or the like.

According to one specific embodiment, the vehicle follows autonomously, i.e., independently, the setpoint trajectory in the parking facility. According to one specific embodiment, the vehicle is guided remotely-controlled. This means, therefore, that the vehicle follows the setpoint trajectory remotely-controlled.

In summary, therefore, the present invention includes, in particular, also offering additional services in conjunction with an automatic driving operation, i.e., in conjunction with a so-called automatic valet parking, these additional services being carried out in an automated manner.

What is claimed is:

1. A parking facility management server for a parking facility, comprising:
    a communication interface configured to receive a request via a communication network from a user of the communication network to carry out at least one vehicle-specific service for a vehicle in the parking facility;
    a processor designed to process the request and to determine whether the service is specific to the vehicle in accordance with the request, in order to check whether or not the at least one service may be carried out in the parking facility for the vehicle in accordance with the request, the processor being further designed to ascertain a response as a function of the check, the communication interface further being configured to transmit the response back to the user via the communication network, and the processor further being designed to plan and to coordinate the carrying out of the service in the event of a positive response that at least one service may be carried out; and
    automatically planning, coordinating, and preparing, via the processor, the at least one vehicle-specific service, wherein the at least one vehicle-specific service is carried out automatically as part of an automatic parking operation of the vehicle,
    wherein the at least one vehicle-specific service includes at least one of a vehicle interior cleaning, vehicle exterior cleaning, filling a fuel tank of the vehicle, charging an electrical energy store, carrying out an inspection, carrying out repairs, carrying out a tire change, carrying out a TUV check, carrying out a HU check, or an exhaust emission test,
    wherein the planning and coordinating includes an ascertainment of a setpoint trajectory to be followed by the vehicle in the parking facility as a function of the requested service,
    wherein the setpoint trajectory includes a start position, a target position, a parking position situated between the start position and the target position and a respective service position situated between the start position and the target position, at which the at least one service is carried out, so that the vehicle is able to drive from the start position to the target position via the parking position and the service position when following the setpoint trajectory,
    carrying out at the least one vehicle-specific service for a vehicle in the parking facility by performing at least one of filling the fuel tank of the vehicle, charging the electrical energy store, carrying out the inspection, carrying out repairs, carrying out the tire change, carrying out the TUV check, carrying out the HU check, or carrying out the exhaust emission test.

2. The parking facility management server as recited in claim 1, wherein the planning and coordinating includes a check of whether or not a service installation is configured for carrying out the at least one service is available, the processor being designed to ascertain the setpoint trajectory as a function of the check whether or not the service installation is available.

3. The parking facility management server as recited in claim 1, wherein the processor is designed to ascertain an instantaneous status of the carrying out of the service, and the communication interface is configured to transmit the instantaneous status via the communication network to the user.

4. The parking facility management server as recited in claim 1, wherein in the event of a problem discovered as the service is being carried out, the communication interface is configured to transmit a message via the communication network to the user, that a problem was discovered as the service was being carried out.

5. The parking facility management server as recited in claim 4, wherein the message includes a request whether the problem is to be remedied.

6. The parking facility management server as recited in claim 1, further comprising:
    a monitoring system configured for at least one of monitoring and recording the carrying out of at least one of the service and a driving of the vehicle in the parking facility.

7. A method for operating a parking facility management server, comprising:
    receiving, by the parking facility management server, a request via a communication network from a user of the communication network to carry out at least one vehicle-specific service for a vehicle in the parking facility;
    processing the request, by the parking facility management server, in order to determine whether the service is specific to the vehicle in accordance with the request and to check whether or not the at least one service may be carried out in the parking facility for the vehicle in accordance with the request;
    ascertaining, by the parking facility management server, a response as a function of the check;

transmitting, by the parking facility management server, the response via the communication network back to the user; and automatically planning, coordinating, and preparing, via the processor, the at least one vehicle-specific service, wherein the at least one vehicle-specific service is carried out automatically as part of an automatic parking operation of the vehicle, wherein the parking facility management server plans and coordinates a carrying out of the service in the event of a positive response that at least one service may be carried out, wherein the at least one vehicle-specific service includes at least one of a vehicle interior cleaning, vehicle exterior cleaning, filling a fuel tank of the vehicle, charging an electrical energy store, carrying out an inspection, carrying out repairs, carrying out a tire change, carrying out a TUV check, carrying out a HU check, or an exhaust emission test, wherein the planning and coordinating includes an ascertainment of a setpoint trajectory to be followed by the vehicle in the parking facility as a function of the requested service, wherein the setpoint trajectory includes a start position, a target position, a parking position situated between the start position and the target position and a respective service position situated between the start position and the target position, at which the at least one service is carried out, so that the vehicle is able to drive from the start position to the target position via the parking position and the service position when following the setpoint trajectory, carrying out at the least one vehicle-specific service for a vehicle in the parking facility by performing at least one of filling the fuel tank of the vehicle, charging the electrical energy store, carrying out the inspection, carrying out repairs, carrying out the tire change, carrying out the TUV check, carrying out the HU check, or carrying out the exhaust emission test.

8. The method as recited in claim 7, wherein the planning and coordinating includes a check whether or not a service installation for carrying out the at least one service is available, the parking facility management server ascertaining the setpoint trajectory as a function of the check whether or not the service installation is available.

9. The method as recited in claim 7, wherein the setpoint trajectory leads multiple times between the parking position and the service position, so that the vehicle is able to drive multiple times between the parking position and the service position when following the setpoint trajectory.

10. A parking system for vehicles, comprising:
a parking facility; and
a parking facility management server for the parking facility, the parking facility management server including a communication interface configured to receive a request via a communication network from a user of the communication network to carry out at least one vehicle-specific service for a vehicle in the parking facility; and a processor designed to process the request and to determine whether the service is specific to the vehicle in accordance with the request, in order to check whether or not the at least one service may be carried out in the parking facility for the vehicle in accordance with the request, the processor being further designed to ascertain a response as a function of the check, the communication interface further being configured to transmit the response back to the user via the communication network, and the processor further being designed to plan and to coordinate the carrying out of the service in the event of a positive response that at least one service may be carried out, and automatically planning, coordinating, and preparing, via the processor, the at least one vehicle-specific service, wherein the at least one vehicle-specific service is carried out automatically as part of an automatic parking operation of the vehicle, wherein the at least one vehicle-specific service includes at least one of a vehicle interior cleaning, vehicle exterior cleaning, filling a fuel tank of the vehicle, charging an electrical energy store, carrying out an inspection, carrying out repairs, carrying out a tire change, carrying out a TUV check, carrying out a HU check, or an exhaust emission test, wherein the planning and coordinating includes an ascertainment of a setpoint trajectory to be followed by the vehicle in the parking facility as a function of the requested service, wherein the setpoint trajectory includes a start position, a target position, a parking position situated between the start position and the target position and a respective service position situated between the start position and the target position, at which the at least one service is carried out, so that the vehicle is able to drive from the start position to the target position via the parking position and the service position when following the setpoint trajectory, carrying out at the least one vehicle-specific service for a vehicle in the parking facility by performing at least one of filling the fuel tank of the vehicle, charging the electrical energy store, carrying out the inspection, carrying out repairs, carrying out the tire change, carrying out the TUV check, carrying out the HU check, or carrying out the exhaust emission test.

11. A non-transitory computer-readable storage medium on which is stored a computer program including program code for operating a parking facility management server, the program code, when executed by a computer, causing the computer to perform:

receiving, by the parking facility management server, a request via a communication network from a user of the communication network to carry out at least one vehicle-specific service for a vehicle in the parking facility;

processing the request, by the parking facility management server, in order to determine whether the service is specific to the vehicle in accordance with the request and to check whether or not the at least one service may be carried out in the parking facility for the vehicle in accordance with the request;

ascertaining, by the parking facility management server, a response as a function of the check;

transmitting, by the parking facility management server, the response via the communication network back to the user; and automatically planning, coordinating, and preparing the at least one vehicle-specific service, wherein the at least one vehicle-specific service is carried out automatically as part of an automatic parking operation of the vehicle, wherein the parking facility management server plans and coordinates a carrying out of the service in the event of a positive response that at least one service may be carried out, wherein the at least one vehicle-specific service includes at least one of a vehicle interior cleaning, vehicle exterior cleaning, filling a fuel tank of the vehicle, charging an electrical energy store, carrying out an inspection, carrying out repairs, carrying out a tire change, carrying out a TUV check, carrying out a HU check, or an exhaust emission test, wherein the planning and coordinating includes an ascertainment of a setpoint trajectory to be followed by the vehicle in the parking facility as a function of the requested service, wherein the setpoint trajectory includes a start position, a target position, a parking position situated between the start position and the target position and a respective service position situated between the start position and the target position, at which the at least one service is carried out, so that the vehicle is able to drive from the start position to the target position via the parking position and the service position when following the setpoint trajectory, carrying out at the least one vehicle-specific service for a vehicle in the parking facility by performing at least one of filling the fuel tank of the vehicle, charging the electrical energy store, carrying out the inspection, carrying out repairs, carrying out the tire change, carrying out the TUV check, carrying out the HU check, or carrying out the exhaust emission test.

\* \* \* \* \*